2,721,787

FREE-FLOWING, NONDUSTING TITANIA

Ames B. Hettrick, Plainfield, N. J., assignor to American Cyanamid Company, New York, N. Y., a corporation of Maine No Drawing. Application October 23, 1950, Serial No. 191,738

1 Claim. (Cl. 23—202)

The present invention relates to titanium dioxide which is especially adapted for ready mixing with dry powdered ceramic frit ingredients. The titanium dioxide is composed of free-flowing, non-dusting aggregates prepared from pigment grade $TiO_2$.

In the manufacture of vitreous enamels, the manufacturers have frequently employed titanium dioxide compounds to impart stable white color to the finished product. Ordinarily the ceramic frit components such as silicon dioxide, borax, sodium carbonate, and the like materials have been dry blended with the titanium dioxide prior to the melting thereof to form the frit which is thereafter pulverized and compounded into the desired enamel. During the furnacing operation the frit components are melted and it is requisite that the titanium dioxide become an integral part of the solution. During recent years, the producers of vitreous enamels have developed continuous dry blending processes for the preparation of the frit mixes. It is therefore necessary, in addition to the above mentioned requisite characteristics of the titanium dioxide, that this component of the mix be characterized by free flow and lack of dusting.

While it is a recognized fact that the most desirable titanium dioxide for ceramic use would be the ordinary $TiO_2$ pigment, preferably having the anatase crystal structure, it has not heretobefore been economically feasible to employ this pigment. This is due to the fact that $TiO_2$ pigments do not flow freely nor are they capable of being employed in dry blending processes. When so employed, the pigment forms sizeable balls which separate from the other components of the dry blend. During the melting of the frit mix these balls of pigment do not enter into the solution and thus the ceramic frit contains isolated concentrations of solid $TiO_2$ pigment. Upon pulverization of the frit and during the subsequent vitrification of the enamel the titanium pigment remains discrete and thus degrades the final enamel coating. In addition to this serious disadvantage, the isolated titanium dioxide, in the absence of the sodium carbonate and other ingredients of the frit, frequently produces a finished product having a yellowish or brown tint rather than the bluish-white color which is desired by the enamel producers.

It is a principal object of this invention to overcome the above described problem by providing microspheroidal titanium dioxide aggregates, most of which are from 30 to 140 microns in diameter, substantially none being smaller than 5 microns or larger than about 150 microns in diameter. The microspheres are characterized by non-dusting and free flow properties and may be easily blended with dry ceramic frit mixes. It is an outstanding feature of the invention that the novel microspheres are composed of pigment grade $TiO_2$ and thus eliminate the necessity for altering the normal commercial operation of pigment manufacture. The spheroidal aggregates also possess a cohesiveness such that they resist rupture during packaging, storage, shipment, and during the dry blending of ceramic frit ingredients.

Briefly, therefore, the invention is directed to free-flowing, non-dusting microspheroidal aggregates composed of calcined pigment grade $TiO_2$ having ultimate particles about 0.2 to about 0.3 micron in size and possessing a specific surface area of about 4.5–9 square meters per gram when analyzed according to the well known nitrogen adsorption technique which was developed by Brunauer, Emmett, and Teller and described in J. A. C. S., volume 60, page 309 (1938). The aggregates have an average size, as regards their largest dimension, such that substantially all thereof will pass through a screen having 100 meshes per square inch and not more than about 25% to about 40% will pass through a screen having 325 meshes per square inch. Aggregates within this size range will be no smaller than about 5 microns or larger than about 150 microns in diameter. In addition to these physical characteristics, the microspheres are also characterized by an apparent density of about 0.5 to about 1.1, and an average rupture resistance of more than 0.5 pound per square inch. The microspheres of the invention, characterized by the above physical properties, do not have any appreciable mutual adhesiveness and are outstanding in their ability to be easily mixed with the ordinary dry powdered ceramic ingredients such as powdered $SiO_2$, $Na_2CO_3$, and $Na_2B_4O_7$, as well as with coloring materials, binders, or other ceramic frit ingredients.

By so providing, the problem of obtaining a titanium dioxide characterized by free flow and lack of dusting and suitable for use in the preparation of dry ceramic frit mixes has been overcome. Another important feature of the invention, as has hereinbefore been stated, resides in the discovery that the novel $TiO_2$ microspheres of the present invention may be suitably produced from ordinary pigment grade $TiO_2$ and that the preparation of a special grade for this particular purpose is therefore unnecessary. Moreover, these spheroidal aggregates may be produced by commercially available methods such as, for example, by spray drying methods or by suitable compression grinding techniques.

In preparing the microspheres by spray drying, the raw material may suitably be the ordinary aqueous slurry of hydroclassified $TiO_2$ pigment obtained, during normal pigment production, from any of the hydroclassification operations, as described, for example in U. S. Patents 2,464,192 and 2,480,092. The $TiO_2$ thus obtained is ordinarily composed of particles smaller than 4 microns in largest dimension. Such aqueous slurries usually contain about 20% solids, and are capable of being directly sprayed into a drying chamber and allowed to fall through hot air and collected in auxiliary equipment as a dried product. The spray drying equipment employed may suitably be the commercially available type which effects disintegration of the slurry by means of a wheel type atomizer. The feed rate, speed of the atomizer, and solids concentration of the feed slurry may be correlated so as to provide dried microspheres within the hereinbefore specified particle size distribution range. Drying temperatures ranging from about 300° F. to about 750° F. may be employed and it has been found that optimum drying temperatures range from about 400° F. to about 600° F.

It has also been found that improved results are frequently obtained when other ingredients are added to the aqueous $TiO_2$ feed slurries fed into the spray drier. Thus, for example, an alkali metal silicate such as sodium silicate added at this point in amounts of about 0.5 to 3% based on the weight of the $TiO_2$, will serve as a binder to increase the rupture resistance of the spray dried product. This material, as well as sodium aluminate, borax, $Al_2O_3$ and other similar compounds will also function as a fluidifying agent for the feed slurries when added in quantities of 0.1% or greater, based on the weight of the $TiO_2$, thus permitting an increase in the solids content of these slurries to 55–60%.

Where the novel titanium dioxide of this invention is to be prepared by compression grinding technique, a suitable raw material is a calciner discharge characterized by a hardness somewhat greater than that ordinarily desired in pigment production, such as is obtained by calcining a TiO₂ hydrolysate for longer times or at higher temperatures, or both, than are ordinarily used to develop optimum pigment properties. Although relatively hard calciner discharge necessitates a more extensive grinding treatment in pigment production, this property is of advantage in the preparation of microspheres inasmuch as such calcined titanium dioxides are well adapted to compression grinding operations to produce the microspheres of this invention. Numerous types of equipment such as roller mills, chaser mills and the like compression grinding machines may be employed. The calciner discharge is ground until the spheroidal aggregates obtained are within the particle size range above described. The compression ground, or nodulized, TiO₂ will be non-dusting, free-flowing, and capable of ready mixing with dry powdered ceramic ingredients without appreciable balling.

In determining the physical properties of TiO₂ microspheres which may be employed in the preparation of dry ceramic frit mixes, the following analytical methods have been employed.

*Apparent density*

A 50 g. sample of TiO₂ microspheres is poured at a uniform rate into a 60° glass funnel and collected in a cylinder having a 50 ml. capacity. The TiO₂ fills and overflows the cylinder. Excess material is struck off the top of the cylinder and the contents weighed. Apparent density may be expressed as $$D = \frac{\text{Wt. (grams)} \times 2}{100}$$

The free-flowing characteristics of the TiO₂ microspheres may be measured during the pouring thereof through the funnel. The freeness of flow may be expressed as time of flow through the funnel in seconds and this will be hereinafter more fully illustrated.

*Rupture resistance*

The apparatus consists of a binocular microscope with 15 x 1.5 (22.5 X) eye pieces and objectives, 10 x 10 mm. graph paper, 22 mm. cover glass and analytical weights.

A camel's hair brush is dipped in a sample of TiO₂ microspheres, held at a distance of 14–18″ above a clean 22 mm. cover glass, and gently tapped to uniformly dust the particles on the cover glass. A piece of 10 x 10 mm. graph paper is placed on the microscope stage and the cover glass specimen is positioned over 4 of the squares. The field is then examined to establish a classification of the particles into large, medium and small units. The large, medium and small particles in each of the 1 mm. squares of the graph paper are then counted after which another cover glass is placed over the TiO₂ particles. The diameter of the medium sized particles is measured with a micrometer eye piece. Weights are then placed on the top cover glass until the large microspheres are shattered, after which weights are again applied in 10 g. increments until the medium sized particles are ruptured. Having determined the breaking load, the rupture resistance is calculated according to the following formula $$\text{Rupture resistance p. s. i.} = \frac{W}{N \pi D^2}$$

where W is the load in pounds at the point of failure, N is the number of microspheres, and D is the mean diameter in inches of the particles.

*Balling test*

The degree to which the TiO₂ microspheres tend to ball in the dry blending of ceramic frit mixes may be easily determined by mixing together in a blender about 40 parts of SiO₂, 30 parts of Na₂B₄O₇, 20 parts of Na₂CO₃, and 20 parts of the TiO₂. After a blending period of 2 hours, the titanium dioxide which has formed into balls may be separated from the other constituents by screening on a 60 mesh screen and examining the screened product visually.

The invention will be more fully described by the following specific example. It should be understood, however, that although this example may describe in detail some of the specific features of the invention, it is given primarily for purposes of illustration and the invention in its broader aspects is not limited thereto.

*Example*

In the following table test results are given for regular commercial anatase TiO₂ pigment having an average ultimate particle size of 0.2–0.3μ, spray dried TiO₂, and compression ground TiO₂. The flow rate of the various samples was measured by pouring a 50 g. quantity of TiO₂ into a 60° glass funnel having a 1 cm. diameter stem and equipped with a gate. The rate of flow is expressed as the number of seconds necessary for the 50 g. sample to flow out of the funnel. In the case of the anatase TiO₂ pigment it was necessary to agitate the material in order to prevent caking of the material in the funnel.

| | Anatase TiO₂ Pigment | Spray Dried Microspheres | | Nodulized Microspheres | |
|---|---|---|---|---|---|
| | | 1% SiO₂ | No SiO₂ | 1% B₂O₃ | No Agent |
| Percent Rutile | Nil | Nil | Nil | >99 | 4.0 |
| Approx. Microsphere Size (Microns) | ~100 | ~40 | ~70 | ~85 | ~60 |
| Ultimate Particle Size (Microns) | 0.21 | 0.24 | 0.22 | 0.23 | 0.25 |
| Specific Surface Area, Sq. M./gm. | 7.5 | 6.6 | 7.1 | 6.4 | 6.4 |
| Screen Size: | | | | | |
| +60 | 0 | 0.8 | 0.6 | 3.2 | 1.4 |
| +100 | 0.3 | 2.4 | 0.2 | 13.0 | 2.6 |
| +200 | 43.9 | 47.4 | 36.4 | 52.6 | 70.0 |
| +325 | 44.1 | 28.4 | 45.4 | 28.2 | 19.8 |
| −325 | 10.0 | 0.6 | 3.2 | 2.8 | 4.6 |
| Apparent Density | 0.67 | 0.81 | 0.76 | 0.94 | 0.65 |
| Rupture Resistance, p. s. i. | | 6.3 | 1.7 | 6.5 | 0.61 |
| Flow Rate, Seconds | 86.0 | 6.1 | 7.6 | | 8.5 |
| Ball Formation | Considerable | None | None | None | Slight |

What I claim is:

Free-flowing, non-dusting microspheroidal aggregates composed of calcined titanium dioxide "ultimate" particles about 0.2 to about 0.3 microns in size and possessing a specific surface area within the range of from about 4.5 to about 9 square meters per gram, as determined by nitrogen gas adsorption, together with about from 0.1 to about 3% of alkali metal silicate as a binder therefor, said aggregates having an average size of about 5 to about 150 microns, an apparent density of 0.5 to 1.1, an average rupture-resistance of at least 0.5 lb. per sq. in., and the property of ready mixing with dry powdered ceramic frit ingredients without balling, having a particle size distribution such that substantially all will pass through a screen having 100 meshes per sq. in. and not more than about 25–40% will pass through a screen having 325 meshes per sq. in. and being composed substantially completely of the anatase crystal modification of $TiO_2$.

References Cited in the file of this patent

UNITED STATES PATENTS

| Number | Name | Date |
|---|---|---|
| 1,937,037 | Hanahan | Nov. 28, 1933 |
| 2,044,941 | Hanahan | June 23, 1936 |
| 2,055,221 | Ravestad | Sept. 22, 1936 |
| 2,131,841 | Lyons | Oct. 4, 1938 |
| 2,253,551 | Booge | Aug. 26, 1941 |
| 2,296,618 | Patterson | Sept. 22, 1942 |
| 2,386,885 | Downs et al. | Oct. 16, 1945 |
| 2,439,895 | Keats et al. | Apr. 20, 1948 |

OTHER REFERENCES

"Titanium," by Barksdale, 1949 ed., pages 272, 273, 328, 382; Ronald Press Co., N. Y.